US011826837B2

(12) United States Patent
Park

(10) Patent No.: US 11,826,837 B2
(45) Date of Patent: Nov. 28, 2023

(54) HOLE SAW WITH HOLE ENLARGEMENT GUIDE AND SUPPORT PIECE DETACHABLE THEREFROM

(71) Applicant: Jong Tae Park, Gangneung-si (KR)

(72) Inventor: Jong Tae Park, Gangneung-si (KR)

( * ) Notice: Subject to any disclaimer, the term of this patent is extended or adjusted under 35 U.S.C. 154(b) by 142 days.

(21) Appl. No.: 17/510,509

(22) Filed: Oct. 26, 2021

(65) Prior Publication Data

US 2022/0126380 A1    Apr. 28, 2022

(30) Foreign Application Priority Data

Oct. 26, 2020  (KR) .................. 10-2020-0138967

(51) Int. Cl.
 *B23B 51/04* (2006.01)
(52) U.S. Cl.
 CPC .... *B23B 51/0426* (2013.01); *B23B 2251/603* (2013.01); *B23B 2260/058* (2013.01)
(58) Field of Classification Search
 CPC ............ B23B 51/0426; B23B 51/0473; B23B 2251/603; B23B 2260/058
 See application file for complete search history.

(56) References Cited

U.S. PATENT DOCUMENTS

| | | | | |
|---|---|---|---|---|
| 4,203,692 A | * | 5/1980 | Jensen | B23B 51/0426 408/96 |
| 4,261,093 A | * | 4/1981 | Steffen | B23B 51/0426 408/1 R |
| 4,749,315 A | * | 6/1988 | Mills | B23B 51/0426 408/209 |
| 5,108,235 A | * | 4/1992 | Czyzewski | B23B 51/0473 408/209 |
| 5,226,762 A | * | 7/1993 | Ecker | B23B 51/0473 408/209 |
| 5,352,071 A | * | 10/1994 | Cochran | B23B 51/0473 408/703 |
| 5,690,452 A | * | 11/1997 | Baublits | B23B 51/0473 414/499 |
| 5,743,682 A | * | 4/1998 | Chaney, Sr. | B23B 51/0426 408/79 |
| 6,341,925 B1 | * | 1/2002 | Despres | B23B 51/0453 408/239 R |
| 6,409,437 B1 | * | 6/2002 | Metzger | B23B 51/0426 408/80 |
| 8,696,268 B2 | * | 4/2014 | Bell | B23B 51/0426 408/80 |
| 8,753,048 B2 | * | 6/2014 | Naughton | B23B 51/0473 408/81 |
| 9,597,736 B2 | * | 3/2017 | Steele | B23B 51/05 |
| 11,364,558 B2 | * | 6/2022 | Ward | B23B 51/0473 |

(Continued)

FOREIGN PATENT DOCUMENTS

DE        2006539 A1 *  2/1970
DE    102016006340 A1 * 11/2017

(Continued)

*Primary Examiner* — Eric A. Gates
(74) *Attorney, Agent, or Firm* — LEX IP MEISTER, PLLC

(57) ABSTRACT

The present invention relates to a hole saw that is mounted on an electric drill to cut a hole formed on a flat plate such as a ceiling, and more particularly, to a hole saw with hole enlargement guide and support pieces detachable therefrom that is capable of cutting a hole with a larger size (diameter) than a hole already cut in a ceiling.

10 Claims, 11 Drawing Sheets

(56) References Cited

U.S. PATENT DOCUMENTS

2012/0183366 A1* 7/2012 Stenman ............. B23B 51/0426
                        408/1 BD
2019/0015906 A1* 1/2019 Majoria ............. B23B 51/0426

FOREIGN PATENT DOCUMENTS

| FR | 2892958 A1 | * | 5/2007 |
| GB | 2215246 A | * | 9/1989 |
| GB | 2257381 A | * | 1/1993 |
| JP | 61152309 A | * | 7/1986 |
| KR | 20100025055 A | * | 3/2010 |
| KR | 20180105536 A | * | 9/2018 |

* cited by examiner

[FIG 1]   -- Prior Art --
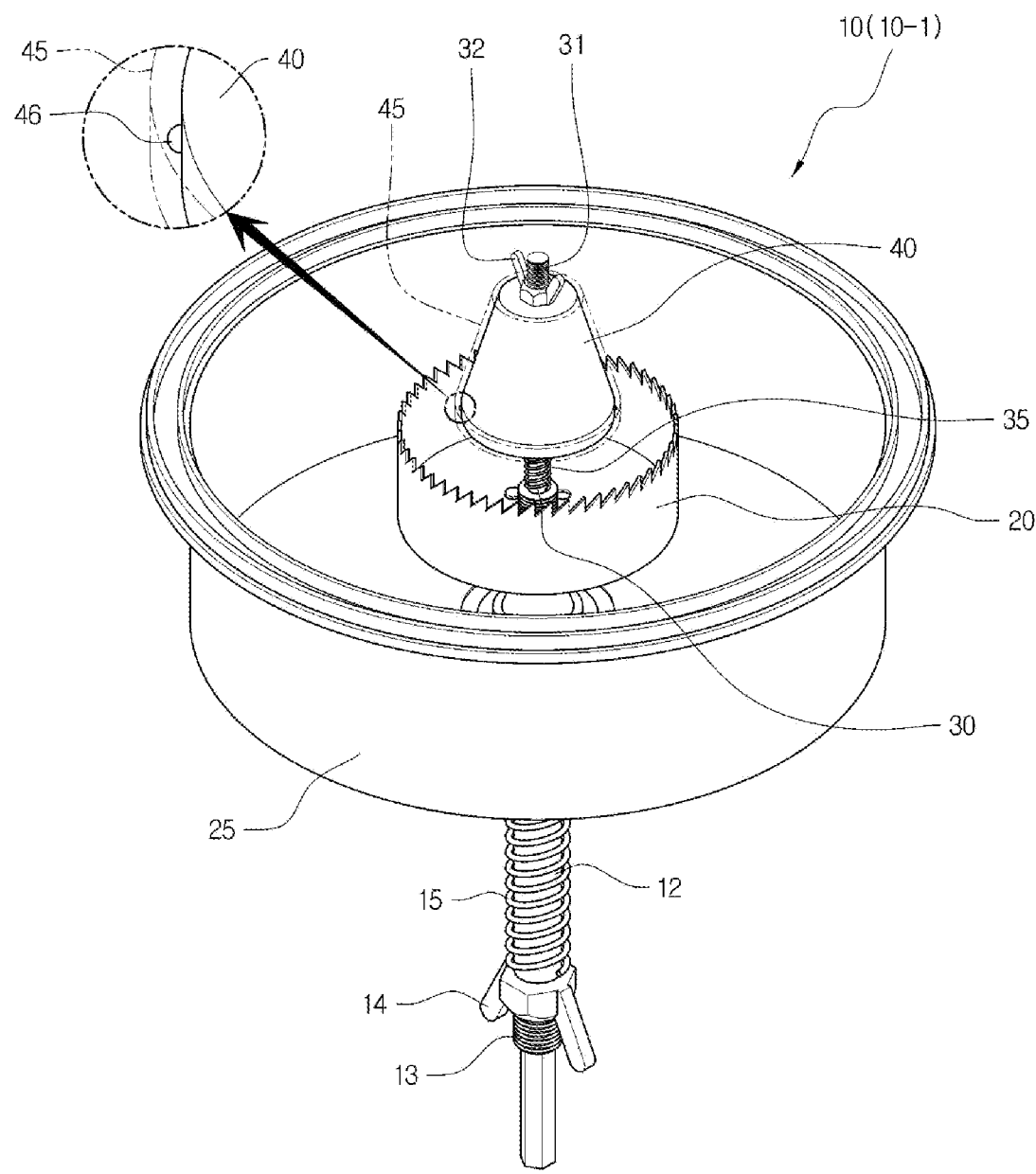

[FIG 2]
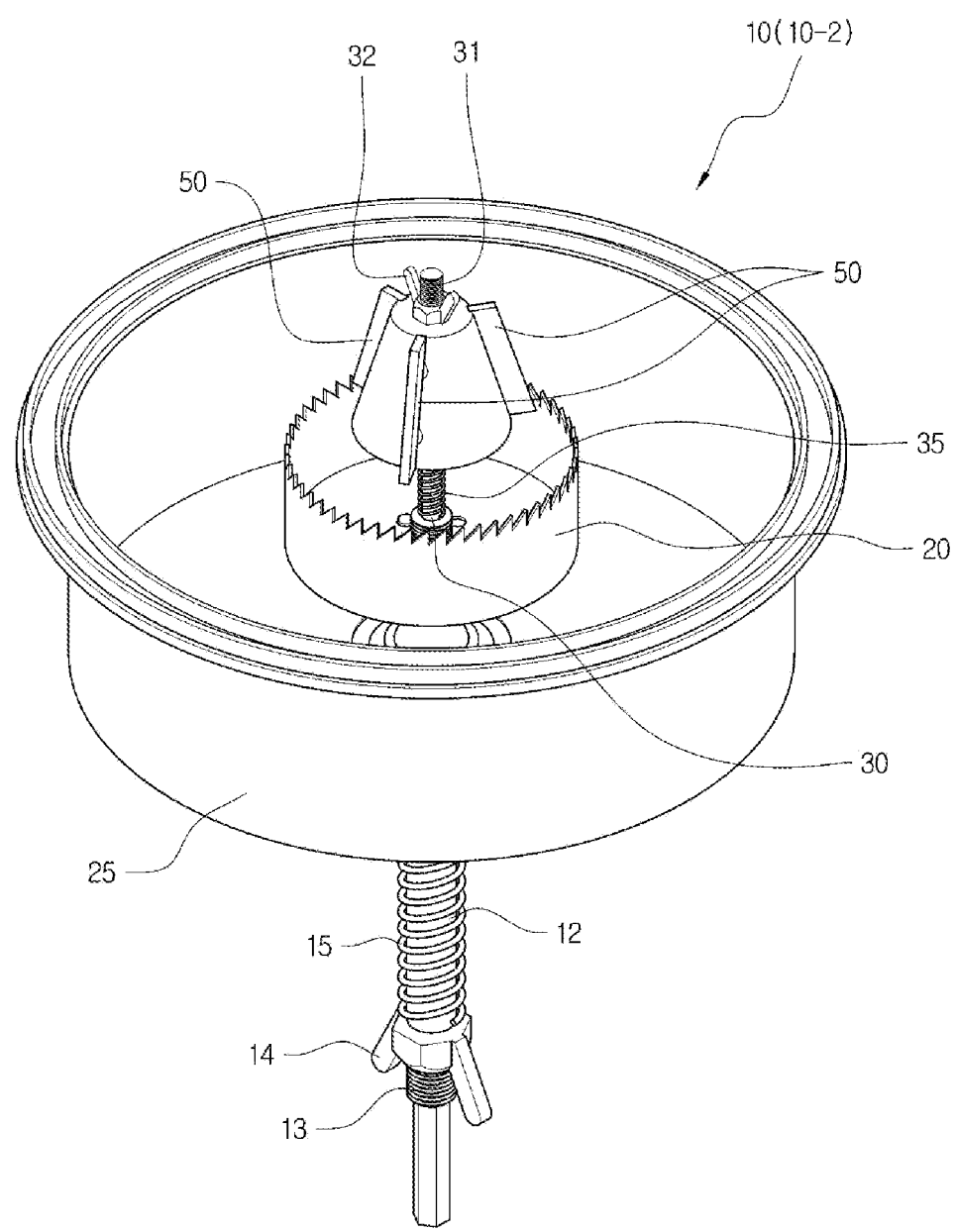

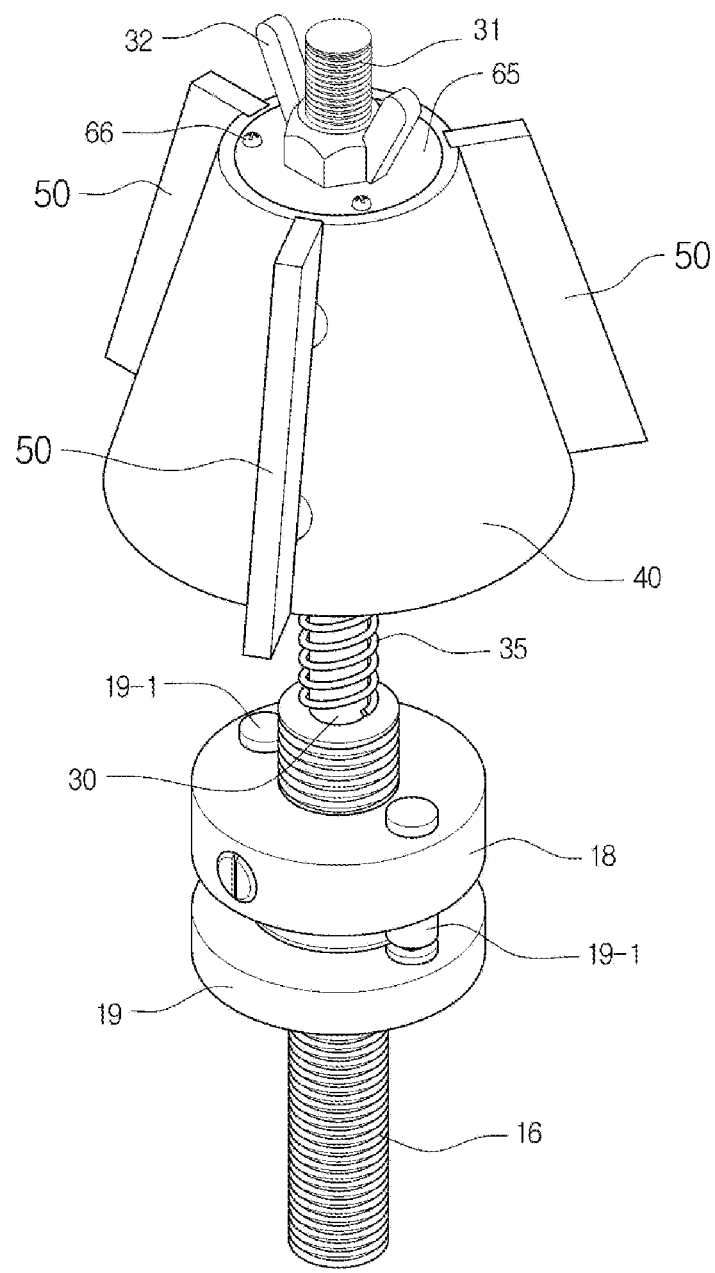
[FIG 3]

[FIG 4]
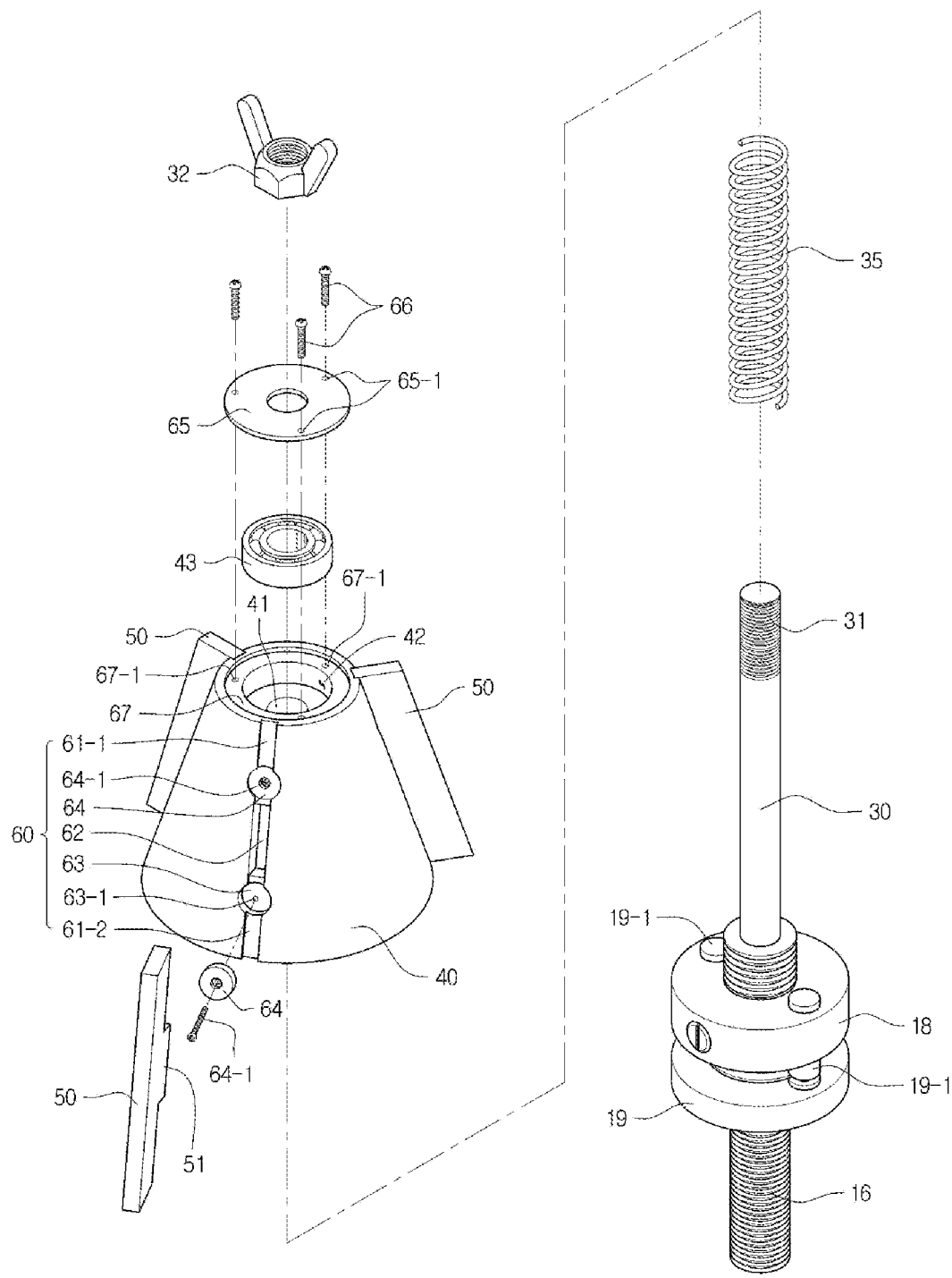

[FIG 5]
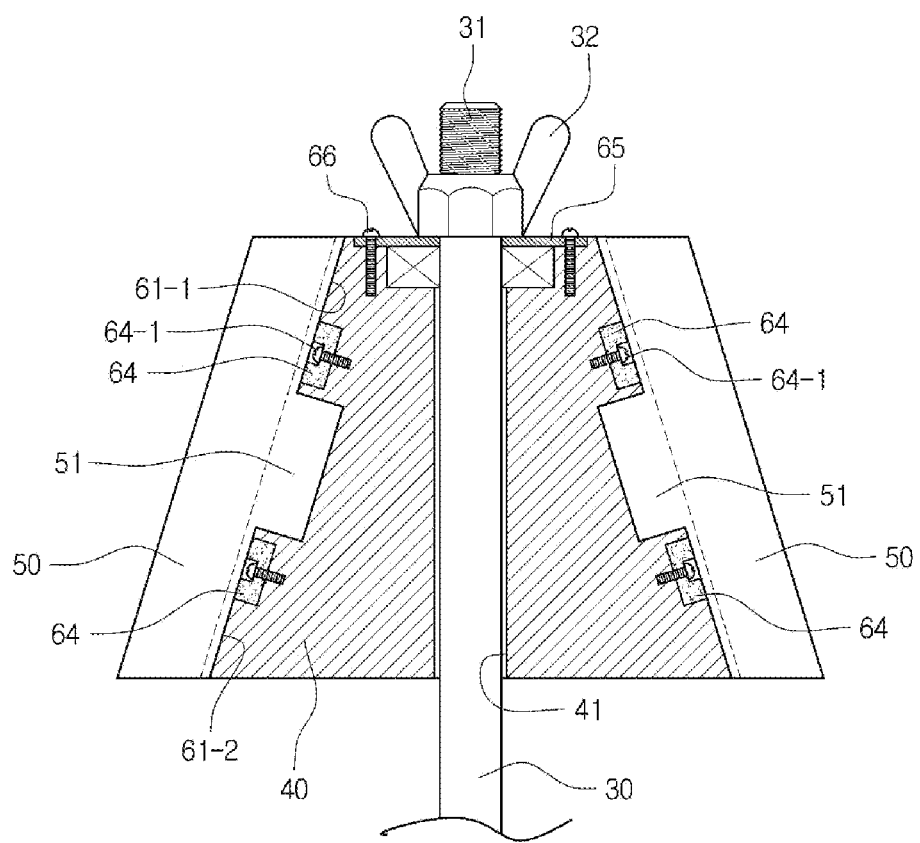

[FIG 6a]
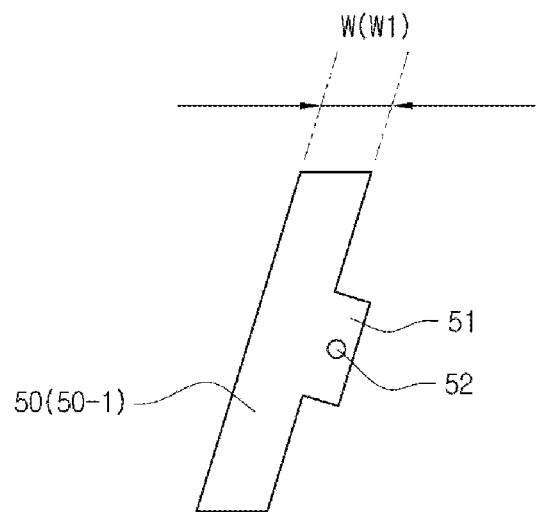
[FIG 6b]
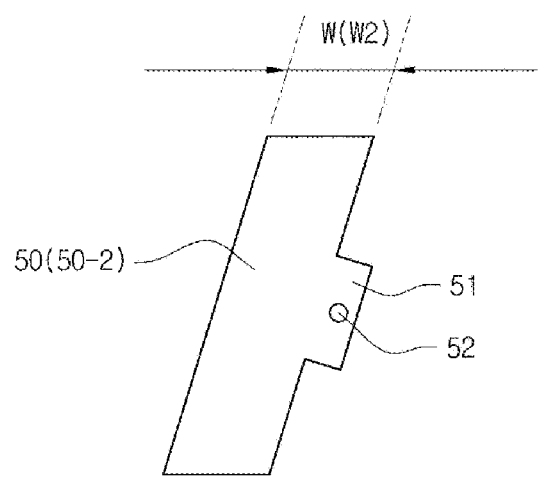

[FIG 6c]
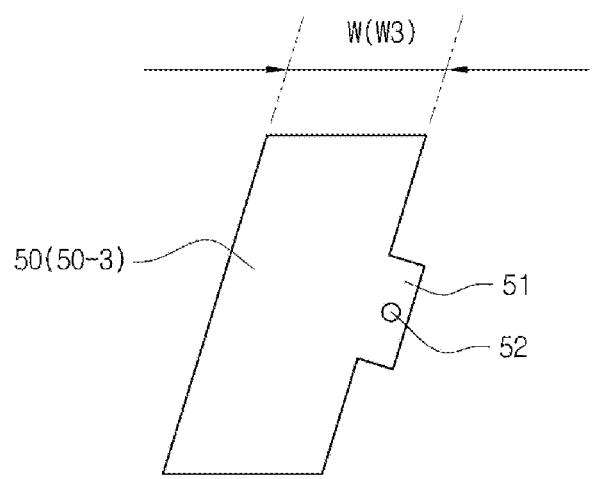

[FIG 7a]
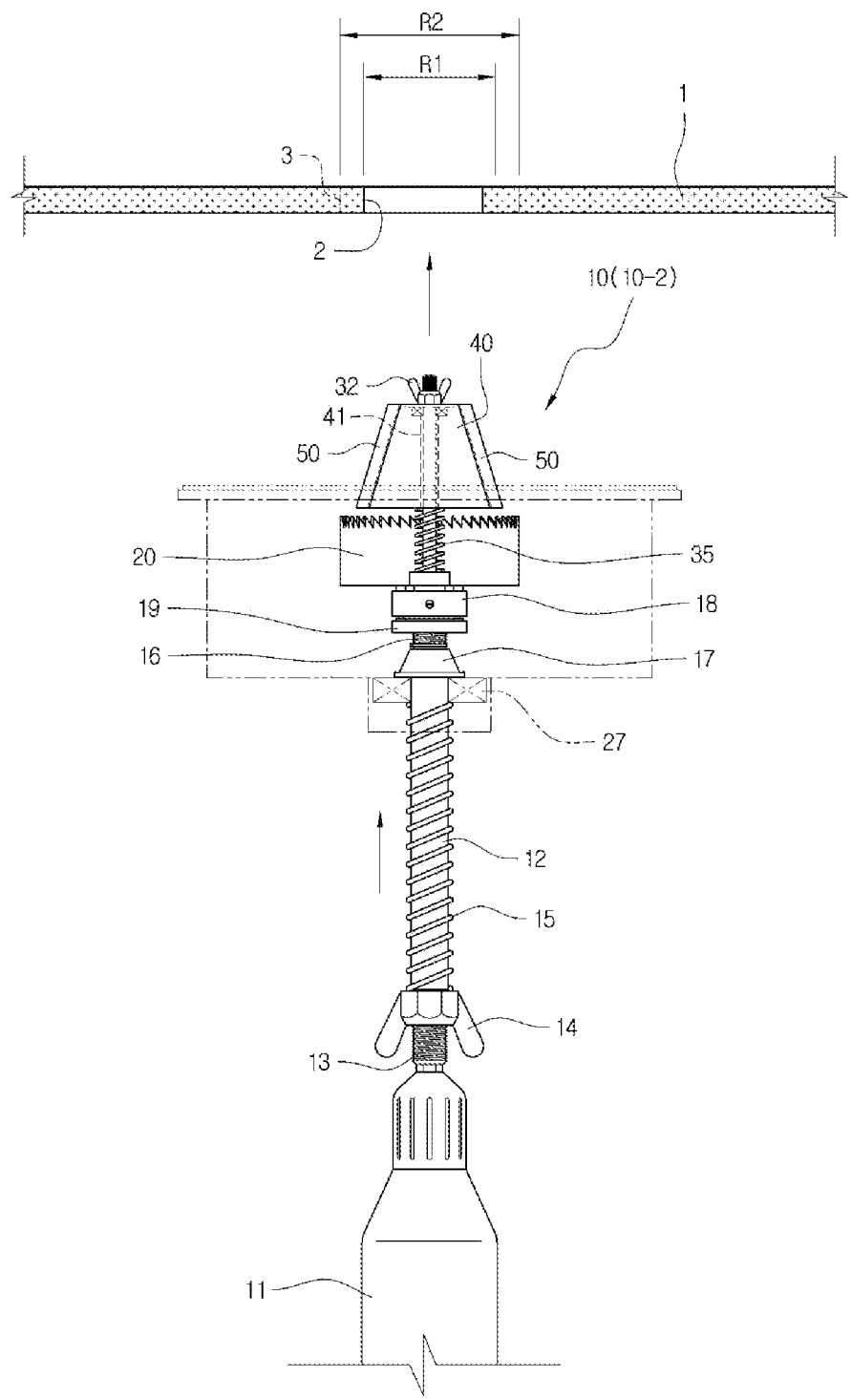

[FIG 7b]
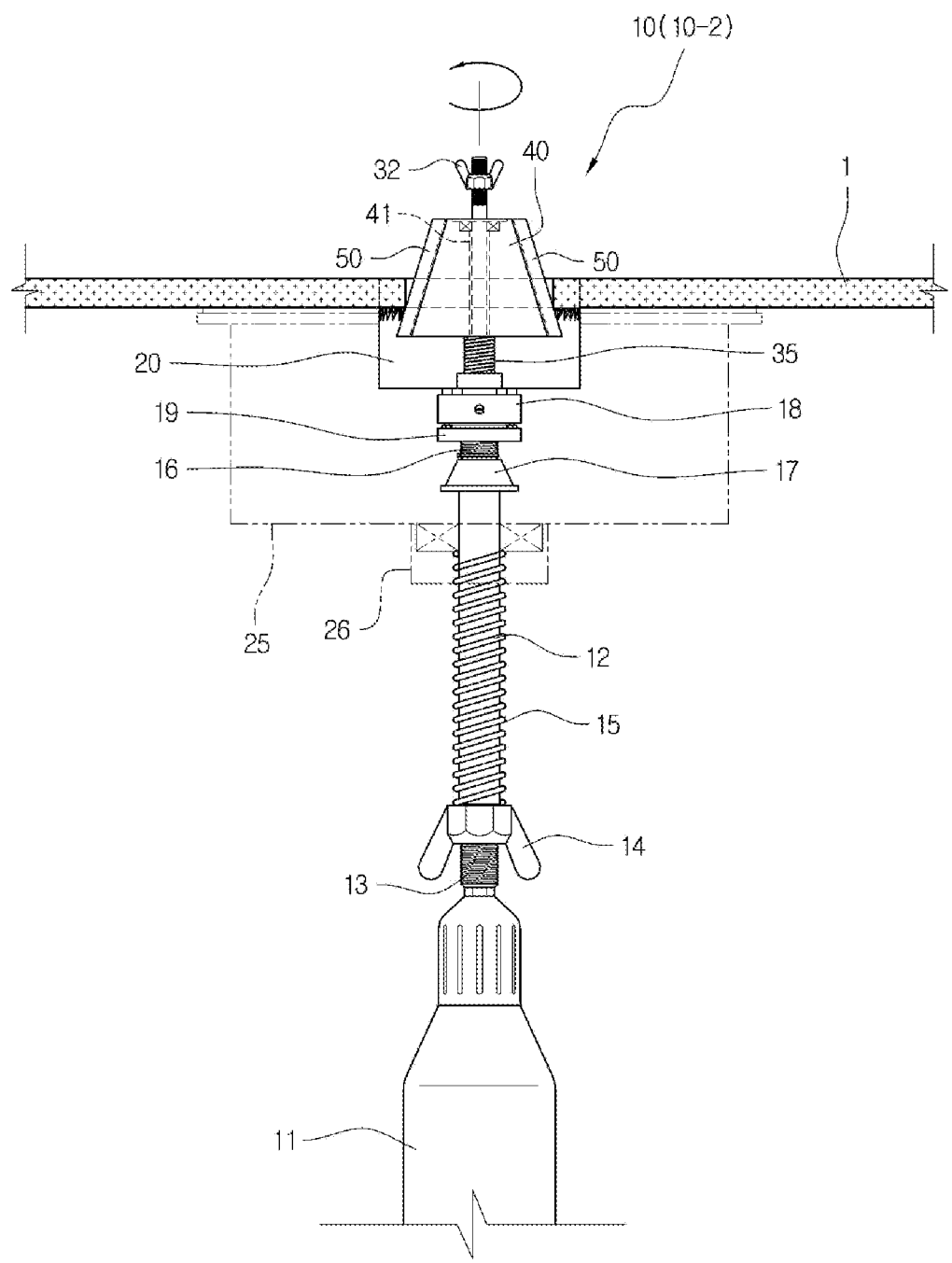

[FIG 8a]
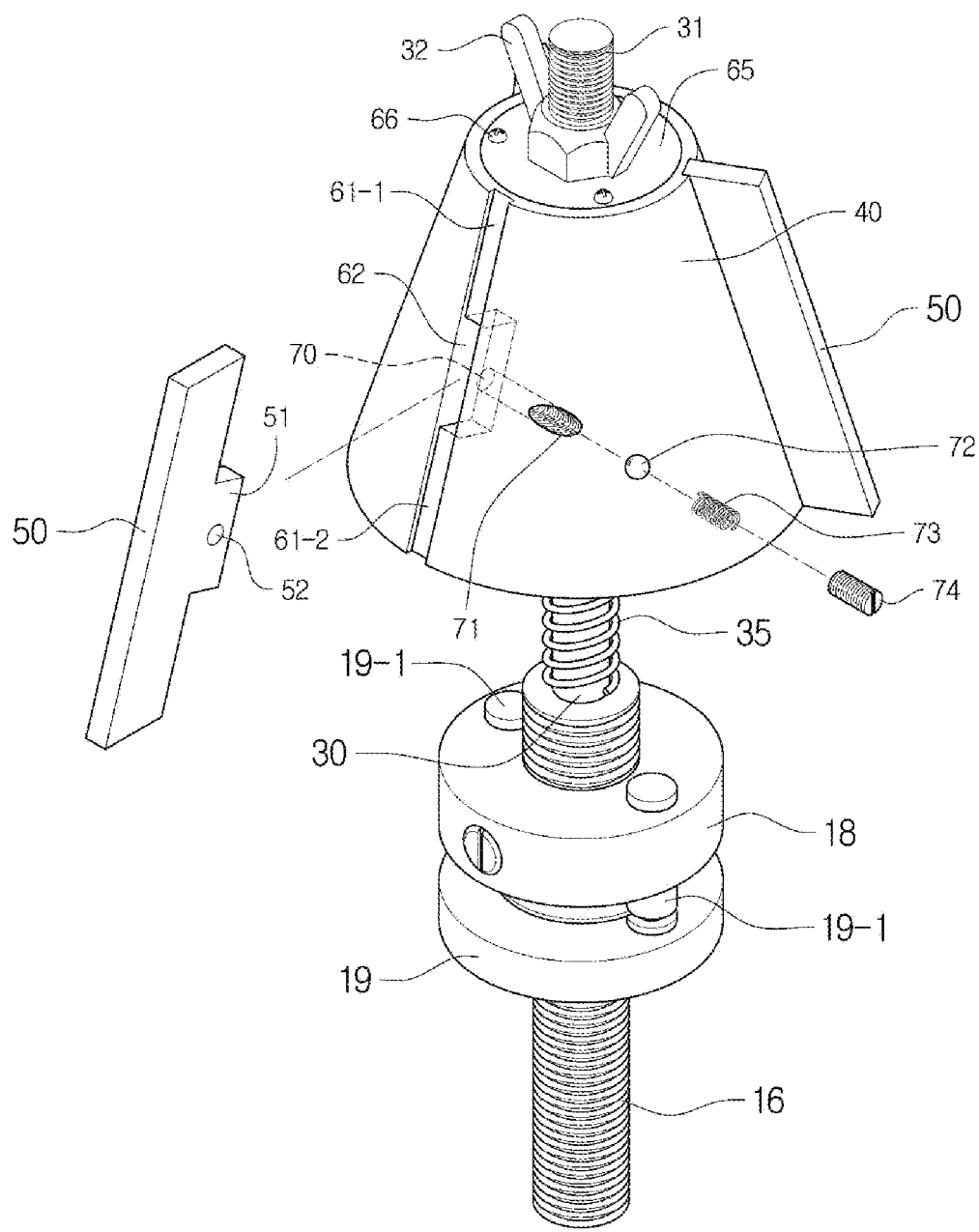

[FIG 8b]
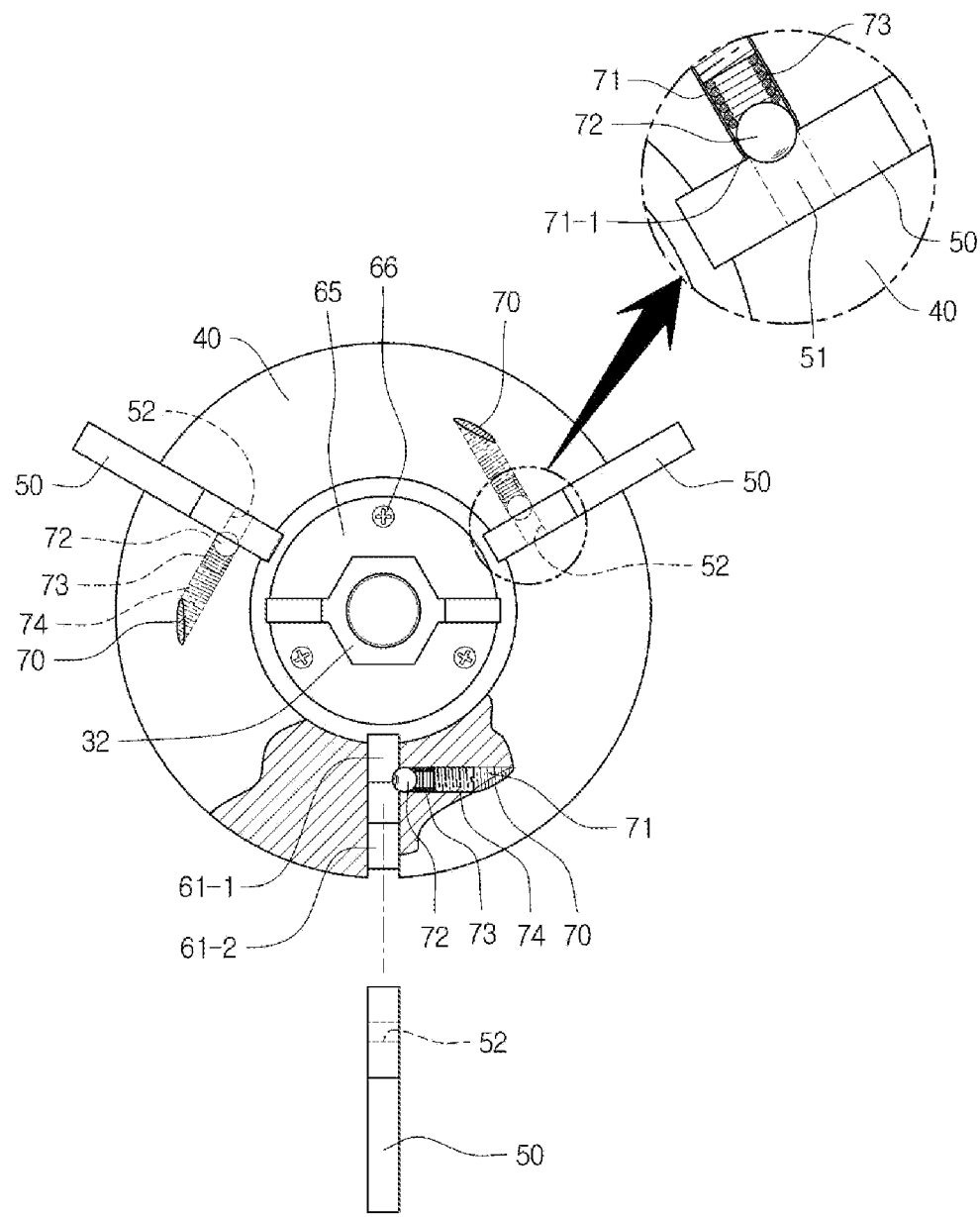

HOLE SAW WITH HOLE ENLARGEMENT GUIDE AND SUPPORT PIECE DETACHABLE THEREFROM

CROSS REFERENCE TO RELATED APPLICATION OF THE INVENTION

The present application claims the benefit of Korean Patent Application No. 10-2020-0138967 filed in the Korean Intellectual Property Office on Oct. 26, 2020, the entire contents of which are incorporated herein by reference.

BACKGROUND OF THE INVENTION

Field of the Invention

The present invention relates to a hole saw that is mounted on an electric drill to cut a hole formed on a flat plate such as a ceiling, and more particularly, to a hole saw with hole enlargement guide and support pieces detachable therefrom that is capable of cutting a hole with a larger size (diameter) than a hole already cut in a ceiling.

In specific, the present invention relates to a hole saw with hole enlargement guide and support pieces detachable therefrom that includes a drive shaft mounted on a chuck of an electric drill, a nose bolt and a nose flywheel disposed on the front end periphery of the drive shaft, a flywheel nut screw-coupled to the drive shaft under the nose flywheel, a plurality of fastening rods spaced apart from each other and fitted to the nose flywheel to allow the underside ends thereof to be restrained onto the top surface of the flywheel nut, a hole saw body screw-coupled and separated to and from the outer periphery of the nose bolt, a coil spring and a dust scattering prevention cap sequentially coupled to the drive shaft formed integrally with the lower end periphery of the nose bolt, a conical fastener-fitting rod formed integrally with the center of top end periphery of the nose bolt and having a screw portion formed on the upper end periphery thereof to allow the hole saw body to be detachably mounted thereon, a conical fastener-bouncing coil spring first fitted to the conical fastener-fitting rod from top side of the hole saw body, a conical fastener having the shape of a cone whose top becomes narrow and bottom becomes wide, fixedly coupled to top side of the conical fastener-bouncing coil spring, and having an insertion and removal hole formed along the center thereof in up and down directions thereof, and the hole enlargement guide and support pieces spaced apart from each other at given intervals on the outer peripheral surface of the conical fastener and detachably mounted onto the conical fastener through a detachable part.

Background of the Related Art

Generally, a hole saw is mounted onto an electric drill to cut a hole with a given size in a flat plate such as a ceiling so that a variety of devices such as lamps, speakers, fire detectors, and the like are built in the flat plate.

Conventional hole saws are disclosed in Korean Utility Model Publication No. 20-1990-10985, Korean Patent Publication No. 10-1994-10892, Korean Patent Application Laid-open No. 10-2004-74943, and Korean Patent No. 10-0473035.

Now, one conventional hole saw 10 will be explained with reference to FIG. 1.

The hole saw 10 includes a drive shaft 12 mounted onto a chuck of an electric drill, a nose bolt and a nose flywheel disposed on the front end periphery of the drive shaft 12, a flywheel nut screw-coupled to the drive shaft 12 under the nose flywheel, and a plurality of fastening rods spaced apart from each other and fitted to the nose flywheel to allow the underside ends thereof to be restrained onto the top surface of the flywheel nut.

Further, the hole saw 10 includes a center drill mounted on the center of the front surface of the nose bolt and a hole saw body 20 screw-coupled and separated to and from the outer periphery of the nose bolt by means of a fastening nut rod disposed on the center of the nose bolt.

Besides, the hole saw 10 includes a dust scattering prevention cap 25 disposed to surround the hole saw body 20 in a state where a support ring is fitted to a support of the drive shaft 12 under a conical head.

If it is desired to cut a hole in a ceiling using the hole saw 10, the center drill is fixed to a given position, and in this state, the electric drill operates to rotate the hole saw body 20, so that through the rotation of the hole saw body 20, the hole having a given size (diameter) can be cut.

If it is desired to enlarge the existing hole to a larger diameter than the diameter of the existing hole using the hole saw 10, however, the following disadvantages may occur.

First, lumber is inserted into the interior (top side) of the ceiling through the existing hole with a small diameter cut in the ceiling, and next, the ceiling and the lumber are fixed to each other by means of fixing members such as long bolts and screws. After that, the existing hole saw body 20 with a small diameter, which is currently used, is changed with another hole saw body 20 with a large diameter.

In the state where the ceiling and the lumber are fixed integrally to each other by means of the long bolts and screws, the center drill is inserted into the existing hole, and the electric drill operates to rotate both of the center drill and the hole saw body 20, so that the lumber is drilled by the center drill and simultaneously the hole with the large diameter is cut by the hole saw body 20.

To cut the hole with the large diameter in the ceiling using the conventional hole saw 10, accordingly, the ceiling and the lumber have to be fixed to each other by means of the long bolts and screws in the state where the lumber is inserted into the interior (top side) of the ceiling, which causes many inconveniences and lots of time.

Further, if the conventional hole saw 10 is not firmly grasped at the time when the lumber is drilled by the center drill and simultaneously the hole with the large diameter is cut by the hole saw body 20, both of the hole saw 10 and the electric drill are shaken to thus fail to easily cut the hole to be enlarged. Moreover, the hole may be slantedly enlarged according to a position where the center drill is (screw)-coupled to the lumber, thereby failing to cut the hole at an accurate position.

To solve the problems the conventional hole saw 10 has had, accordingly, another conventional hole saw is disclosed in Korean Patent No. 10-1926253 (entitled "Hole saw with detachable enlargement cap") as issued to the same applicant as the invention.

Referring to FIG. 1, the hole saw 10-1 with a detachable enlargement cap will be explained.

The hole saw 10-1 is configured to allow an enlargement cap 45 to be mounted on the outer peripheral surface of a conical fastener 40 and thus restrained or released onto or from the conical fastener 40 through a restraining (detachable) means using fastening balls 46.

According to the hole saw 10-1, however, it is hard to easily manufacture and machine the enlargement caps 45 with different sizes, and further, high manufacturing costs for the enlargement caps 45 are needed. Besides, the restraining (detachable) means using the fastening balls 46 is complicated in structure, and accordingly, it cannot be easily installed on the enlargement cap 45. In addition, the fastening balls 46 may escape and be thus lost.

SUMMARY OF THE INVENTION

Accordingly, the present invention has been made in view of the above-mentioned problems occurring in the related art, and it is an object of the present invention to provide a hole saw with hole enlargement guide and support pieces detachable therefrom that includes a drive shaft mounted on a chuck of an electric drill, a nose bolt and a nose flywheel disposed on the front end periphery of the drive shaft, a flywheel nut screw-coupled to the drive shaft under the nose flywheel, a plurality of fastening rods spaced apart from each other and fitted to the nose flywheel to allow the underside ends thereof to be restrained onto the top surface of the flywheel nut, a hole saw body screw-coupled and separated to and from the outer periphery of the nose bolt, a coil spring and a dust scattering prevention cap sequentially coupled to the drive shaft formed integrally with the lower end periphery of the nose bolt, a conical fastener-fitting rod formed integrally with the center of top end periphery of the nose bolt and having a screw portion formed on the upper end periphery thereof to allow the hole saw body to be detachably mounted thereon, a conical fastener-bouncing coil spring first fitted to the conical fastener-fitting rod from top side of the hole saw body, a conical fastener having the shape of a cone whose top becomes narrow and bottom becomes wide, fixedly coupled to top side of the conical fastener-bouncing coil spring, and having an insertion and removal hole formed along the center thereof in up and down directions thereof, and the hole enlargement guide and support pieces spaced apart from each other at given intervals on the outer peripheral surface of the conical fastener and detachably mounted onto the conical fastener through a detachable part.

It is another object of the present invention to provide a hole saw with hole enlargement guide and support pieces detachable therefrom that is configured to allow the hole enlargement guide and support pieces mounted on the outer peripheral surface of a conical fastener to be easily detachable from the conical fastener through a detachable part and configured to allow the hole enlargement guide and support pieces to be freely set in size (width) and appropriately selected according to the size (diameter) of the existing hole to thus cut a hole having a larger diameter than the existing hole with ease.

It is yet another object of the present invention to provide a hole saw with hole enlargement guide and support pieces detachable therefrom that is configured to allow the hole enlargement guide and support pieces mounted on the outer peripheral surface of a conical fastener to be simple in structure so that since they can be easily made, conveniently handled because they are lightweight, and have various sizes, they can be freely selected and detachably mounted onto the conical fastener, thereby ensuring wide adaptability.

To accomplish the above-mentioned objects, according to the present invention, there is provided a hole saw with hole enlargement guide and support pieces detachable therefrom that includes a drive shaft mounted on a chuck of an electric drill, a nose bolt and a nose flywheel disposed on the front end periphery of the drive shaft, a flywheel nut screw-coupled to the drive shaft under the nose flywheel, a plurality of fastening rods spaced apart from each other and fitted to the nose flywheel to allow the underside ends thereof to be restrained onto the top surface of the flywheel nut, a hole saw body screw-coupled and separated to and from the outer periphery of the nose bolt, a coil spring and a dust scattering prevention cap sequentially coupled to the drive shaft formed integrally with the lower end periphery of the nose bolt, a conical fastener-fitting rod formed integrally with the center of top end periphery of the nose bolt and having a screw portion formed on the upper end periphery thereof to allow the hole saw body to be detachably mounted thereon, a conical fastener-bouncing coil spring first fitted to the conical fastener-fitting rod from top side of the hole saw body, a conical fastener having the shape of a cone whose top becomes narrow and bottom becomes wide, fixedly coupled to top side of the conical fastener-bouncing coil spring, and having an insertion and removal hole formed along the center thereof in up and down directions thereof, and the hole enlargement guide and support pieces spaced apart from each other at given intervals on the outer peripheral surface of the conical fastener and detachably mounted onto the conical fastener through a detachable part.

BRIEF DESCRIPTION OF THE DRAWINGS

The above and other objects, features and advantages of the present invention will be apparent from the following detailed description of the embodiments of the invention in conjunction with the accompanying drawings, in which:

FIG. 1 is a perspective view showing a hole saw with a detachable enlargement cap, which is issued to the same applicant as in this invention;

FIG. 2 is a perspective view showing a hole saw with hole enlargement guide and support pieces detachable therefrom according to the present invention;

FIG. 3 is an enlarged perspective view showing main parts of the hole saw with hole enlargement guide and support pieces detachable therefrom according to the present invention;

FIGS. 4 and 5 are exploded perspective and sectional views showing the hole saw with hole enlargement guide and support pieces detachable therefrom according to the present invention;

FIGS. 6A to 6C are side views showing examples of the hole enlargement guide and support pieces of the hole saw according to the present invention;

FIGS. 7A and 7B are front views showing operating relations of the parts constituting the hole saw with hole enlargement guide and support pieces detachable therefrom according to the present invention; and FIGS. 8A and 8B are perspective and top views showing another example of the detachable part of the hole saw with hole enlargement guide and support pieces detachable therefrom according to the present invention.

DETAILED DESCRIPTION OF THE PREFERRED EMBODIMENT

Objects, characteristics and advantages of the present invention will be more clearly understood from the detailed description as will be described below and the attached drawings.

The specific embodiments of the present invention are illustrated in FIGS. 2 to 8B. In specific, FIG. 2 is a perspective view showing a hole saw with hole enlargement guide and support pieces detachable therefrom according to the present invention, FIG. 3 is an enlarged perspective view showing main parts of the hole saw with hole enlargement guide and support pieces detachable therefrom according to the present invention, FIGS. 4 and 5 are exploded perspective and sectional views showing the hole saw with hole enlargement guide and support pieces detachable therefrom according to the present invention, FIGS. 6A to 6C are side views showing examples of the hole enlargement guide and support pieces of the hole saw according to the present invention, FIGS. 7A and 7B are front views showing operating relations of the parts constituting the hole saw with hole enlargement guide and support pieces detachable therefrom according to the present invention, and FIGS. 8A and 8B are perspective and top views showing another example of the hole saw with hole enlargement guide and support pieces of the hole saw according to the present invention.

First, a hole saw 10-2 with hole enlargement guide and support pieces detachable therefrom according to the present invention will be explained.

The hole saw 10-2 with hole enlargement guide and support pieces detachable therefrom according to the present invention includes a drive shaft 12 mounted on a chuck of an electric drill 11, a nose bolt 16 and a nose flywheel 18 disposed on the front end periphery of the drive shaft 12, a flywheel nut 19 screw-coupled to the drive shaft 12 under the nose flywheel 18, and a plurality of fastening rods 19-1 spaced apart from each other and fitted to the nose flywheel 18 to allow the underside ends thereof to be restrained onto the top surface of the flywheel nut 19.

Further, the hole saw 10-2 includes a hole saw body 20 screw-coupled and separated to and from the outer periphery of the nose bolt 16 and a coil spring 15 and a dust scattering prevention cap 25 sequentially coupled to the drive shaft 12 formed integrally with the lower end periphery of the nose bolt 16.

Also, the hole saw 10-2 includes a conical fastener-fitting rod 30 disposed integrally with the center of top end periphery of the nose bolt 16 and having a screw portion 31 formed on the upper end periphery thereof to allow the hole saw body 20 to be detachably mounted thereon, a conical fastener-bouncing coil spring 35 first fitted to the conical fastener-fitting rod 30 from top side of the hole saw body 20, and a conical fastener 40 fixedly coupled to top side of the conical fastener-bouncing coil spring 35.

In specific, the conical fastener 40 is made of a metal or synthetic resin and has the shape of a cone whose top becomes narrow and bottom becomes wide. Further, the conical fastener 40 has an insertion and removal hole 41 formed along the center thereof in up and down directions thereof to insert and remove the conical fastener-fitting rod 30 and the conical fastener-bouncing coil spring 35 thereinto and therefrom, and a bearing accommodation room 42 formed on top end periphery of the insertion and removal hole 41 to insert a bearing 43 thereinto.

To allow the conical fastener 40 fitted to the conical fastener-fitting rod 30 and bounced by the conical fastener-bouncing coil spring 35 to be restrained onto the top end periphery of the conical fastener-fitting rod 30, the screw portion 31 is formed on the upper end periphery of the conical fastener-fitting rod 30 and thus coupled to a butterfly nut 32.

The hole saw 10-2 having the parts mentioned above is the same as or similar to the conventional hole saw 10 and the conventional hole saw 10-1 for hole enlargement, and accordingly, a more specific explanation of the above-mentioned parts of the hole saw 10-2 will be avoided.

A plurality of hole enlargement guide and support pieces 50 made of a metal or synthetic resin are spaced apart from each other at given intervals on the outer peripheral surface of the conical fastener 40 fitted to the conical fastener-fitting rod 30 and thus detachably mounted onto the conical fastener 40 through a detachable part as will be discussed later.

The hole enlargement guide and support pieces 50 may be formed with examples as shown in FIGS. 4 to 6C. Each hole enlargement guide and support piece 50 is the same or similar in length as or to the outer peripheral surface of the conical fastener 40 and has a fastening protrusion 51 protruding from the center of the front end thereof and thus fastened to a fastening groove 62 of the detachable part as will be discussed later. Further, each hole enlargement guide and support piece 50 has a fastening through hole 52 formed horizontally on the fastening protrusion 51.

In specific, as shown in FIGS. 6A to 6C, the hole enlargement guide and support pieces 50-1, 50-2, and 50-3 may have various widths W such as a narrow width W1, a medium width W2, and a wide width W3, and as the hole enlargement guide and support pieces 50 have various widths W, like this, they are appropriately selected in width according to the existing hole 2 having a small diameter R1 cut in a ceiling 1 and then mounted onto the conical fastener 40.

The detachable part 60 for fastening the hole enlargement guide and support pieces 50 to the outer peripheral surface of the conical fastener 40 includes a plurality of fastening grooves 62 spaced apart from each other at given intervals along the horizontal center lines of the outer peripheral surface of the conical fastener 40 and coupling grooves 61-1 and 61-2 formed linearly on top and underside of each fastening groove 62, and in this case, each fastening groove 62 formed on the horizontal center line of the outer peripheral surface of the conical fastener 40 has a depth greater than each of the coupling grooves 61-1 and 61-2 formed linearly on top and underside thereof.

Further, the detachable part 60 includes magnet insertion grooves 63 with screw holes 63-1 formed between the coupling groove 61-1 and the top end of the fastening groove 62 and the coupling groove 61-2 and the underside end of the fastening groove 62 and disc-shaped magnets 64 fastened to the magnet insertion grooves 63 by means of fastening bolts 64-1.

The disc-shaped magnets 64 are fastened to the magnet insertion grooves 63, and accordingly, the hole enlargement guide and support pieces 50 are desirably made of a metal material.

The hole enlargement guide and support pieces 50 are insertedly fastened to the fastening grooves 62 and the coupling grooves 61-1 and 61-2 that are formed linearly on the outer peripheral surfaces of the conical fastener 40, and in this case, the fastening protrusions 51 of the hole enlargement guide and support pieces 50 are coupledly inserted into the fastening grooves 62. Next, if the inner front ends (top and underside ends) of the fastening protrusions 51 are inserted into the coupling grooves 61-1 and 61-2, they are pulled by the magnetic forces of the magnets 64 inserted into the magnet insertion grooves 63 and thus kept at restrained states.

Further, the hole saw 10-2 includes an escape prevention washer 65 mounted on top end periphery of the conical fastener 40 to allow the top bearing 43 to be easily coupled to the conical fastener 40 and to prevent the top bearing 43 from escaping from the top end periphery of the conical fastener 40.

Moreover, the hole saw 10-2 includes a washer insertion groove 67 formed on top end periphery of the conical fastener 40, communicating with the bearing accommodation room 42 and having a plurality of screw holes 67-1 formed along the inner periphery thereof, and accordingly, the escape prevention washer 65, which has a through hole formed on the center thereof and a plurality of fastening holes 65-1 formed along the edge periphery thereof on the same lines as the screw holes 67-1, is seated onto the washer insertion groove 67. Accordingly, fastening bolts 66 are inserted into the fastening holes 65-1 of the escape prevention washer 65 and coupled to the screw holes 67-1, so that the escape prevention washer 65 is seated onto the washer insertion groove 67.

FIGS. 8A and 8B are perspective and top views showing another example of the detachable part of the hole saw 10-2 with hole enlargement guide and support pieces detachable therefrom according to the present invention, and another detachable part 60 is provided to thus fasten the hole enlargement guide and support pieces 50 to the outer peripheral surface of the conical fastener 40.

In this case, the detachable part 60 includes a plurality of fastening grooves 62 spaced apart from each other at given intervals along the horizontal center lines of the outer peripheral surface of the conical fastener 40 and coupling grooves 61-1 and 61-2 formed linearly on top and underside of each fastening groove 62.

In this case, further, the detachable part 60 includes a fastening ball accommodation room 70 formed on one side surface of each fastening groove 62 in such a manner as to pierced from the outer peripheral surface of the conical fastener 40 to the fastening groove 62 to allow the outer peripheral surface of the conical fastener 40 and the fastening groove 62 to communicate with each other and having a front end periphery 71-1 smaller than a diameter of a fastening ball 72.

Further, the fastening ball accommodation room 70 has a screw portion 71 formed on the inner peripheral surface thereof, and in a state where the fastening ball 72 and a coil spring 73 are inserted sequentially into the fastening ball accommodation room 70, a tension control bolt 74 is coupled to the screw portion 71 of the fastening ball accommodation room 70.

As the tension control bolt 74 is coupled to the screw portion 71 of the fastening ball accommodation room 70, the fastening ball 72 and the coil spring 73 are prevented from escaping from the fastening ball accommodation room 70, and through the control of the tension control bolt 74, the bouncing forces of the fastening ball 72 and the coil spring 73 can be adjusted.

Under the above-mentioned configuration, hereinafter, an explanation of the operations of the hole saw 10-2 according to the present invention will be given.

The hole saw 10-2 with the hole enlargement guide and support pieces detachable therefrom according to the present invention is configured to mount only the conical fastener 40 onto the conical fastener-fitting rod 30, and otherwise, as shown in FIGS. 2 to 8B, the hole saw 10-2 is configured to couple the hole enlargement guide and support pieces 50 to the outer peripheral surface of the conical fastener 40.

In the case of the embodiment as shown in FIGS. 2 to 7B, if it is desired to couple the hole enlargement guide and support pieces 50 to the fastening grooves 62 and the coupling grooves 61-1 and 62-1 formed on the outer peripheral surface of the conical fastener 40, the fastening protrusions 51 are inserted into the fastening grooves 62, and the upper and lower front ends of the hole enlargement guide and support pieces 50 are inserted into the coupling grooves 61-1 and 62-1, so that the hole enlargement guide and support pieces 50 made of the metal material are pulled by the magnetic forces of the magnets 64 and thus kept at the restrained states.

In the case of the embodiment as shown in FIGS. 8A and 8B, contrarily, if it is desired to couple the hole enlargement guide and support pieces 50 to the fastening grooves 62 and the coupling grooves 61-1 and 62-1 formed on the outer peripheral surface of the conical fastener 40, the fastening protrusions 51 are inserted into the fastening grooves 62, and the upper and lower front ends of the hole enlargement guide and support pieces 50 are inserted into the coupling grooves 61-1 and 62-1. In specific, if the fastening protrusions 51 are inserted into the fastening grooves 62, the fastening balls 72 inserted into the fastening ball accommodation rooms 70 and bounced by the coil springs 73 are coupled to the fastening through holes 52 to allow the hole enlargement guide and support pieces 50 to be restrained onto the conical fastener 40.

In the case where the hole saw 10-2 according to the present invention is configured to mount only the conical fastener 40 onto the conical fastener-fitting rod 30, the hole saw 10-2 moves upwardly to allow the conical fastener 40 bounced upwardly by the conical fastener-bouncing coil spring 35 to be coupled (inserted) to (into) the existing hole 2.

In the state where the conical fastener 40 is coupled (inserted) to (into) the existing hole 2, if a switch (which is not shown) of the electric drill 11 is turned on, the hole saw body 20 rotates, and if the hole saw 10-2 moves upwardly, next, the ceiling 1 is drilled by the hole saw body 20 to cut the enlarged hole 3 on the outside of the existing hole 2.

Further, as shown in FIGS. 2 to 8B, in the case where the hole saw 10-2 according to the present invention is configured to couple the hole enlargement guide and support pieces 50 to the outer peripheral surface of the conical fastener 40, if it is desired to cut a hole similar in size to the existing hole 2 cut in the ceiling 1, the detachable enlargement cap 45 is coupled (mounted) to (onto) the outer peripheral surface of the conical fastener 40, so that the enlarged hole 3 can be easily cut.

The hole enlargement guide and support pieces 50 are coupled to the outer peripheral surface of the conical fastener 40, and in a state where the conical fastener 40 to which the hole enlargement guide and support pieces 50 are coupled moves upwardly, the hole saw 10-2 according to the present invention moves upwardly, as shown in FIG. 7A. Next, both of the conical fastener 40 and bounced upwardly by the conical fastener-bouncing coil spring 35 and the hole enlargement guide and support pieces 50 can be coupled (inserted) to (into) the existing hole 2.

In the state where the hole enlargement guide and support pieces 50 coupled to the outer peripheral surface of the conical fastener 40 are coupled (inserted) to (into) the existing hole 2, if the switch of the electric drill 11 is turned on, the hole saw body 20 rotates, and accordingly, if the hole saw 10-2 moves more upwardly, as shown in FIG. 7B, the ceiling 1 is drilled by the rotation of the hole saw body 20 to cut the enlarged hole 3 on the outside of the existing hole 2.

As mentioned above, the hole saw 10-2 with the hole enlargement guide and support pieces detachable therefrom according to the present invention is configured to allow the existing hole saw body 20 to be easily changed with another hole saw body 20 having a larger diameter than the existing hole cut in the ceiling, thereby conveniently cutting the hole having a larger diameter than the existing hole, configured to allow the enlarged hole to be cut in the state where the conical fastener to which the hole enlargement guide and support pieces 50 are coupled is fitted to the existing hole, without any movements of the hole enlargement guide and support pieces 50, and configured to allow the hole enlargement guide and support pieces 50 to be freely set in size (height, width, and the like) so that the hole enlargement guide and support pieces 50 are appropriately selected according to the size of the existing hole to easily cut the hole having a larger diameter than the existing hole.

As set forth in the foregoing, the hole saw with the hole enlargement guide and support pieces detachable therefrom according to the present invention includes the drive shaft mounted on the chuck of the electric drill, the nose bolt and the nose flywheel disposed on the front end periphery of the drive shaft, the flywheel nut screw-coupled to the drive shaft under the nose flywheel, the plurality of fastening rods spaced apart from each other and fitted to the nose flywheel to allow the underside ends thereof to be restrained onto the top surface of the flywheel nut, the hole saw body screw-coupled and separated to and from the outer periphery of the nose bolt, the coil spring and the dust scattering prevention cap sequentially coupled to the drive shaft formed integrally with the lower end periphery of the nose bolt, the conical fastener-fitting rod formed integrally with the center of top end periphery of the nose bolt and having the screw portion formed on the upper end periphery thereof to allow the hole saw body to be detachably mounted thereon, the conical fastener-bouncing coil spring first fitted to the conical fastener-fitting rod from top side of the hole saw body, the conical fastener having the shape of a cone whose top becomes narrow and bottom becomes wide, fixedly coupled to top side of the conical fastener-bouncing coil spring, and having the insertion and removal hole formed along the center thereof in up and down directions thereof, and the plurality of hole enlargement guide and support pieces spaced apart from each other at given intervals on the outer peripheral surface of the conical fastener and detachably mounted onto the conical fastener by means of the detachable part.

According to the present invention, the hole saw is configured to allow the hole enlargement guide and support pieces mounted on the outer peripheral surface of the conical fastener to be easily detachable from the conical fastener through the detachable part, configured to allow the hole enlargement guide and support pieces to be freely set in size (width) and appropriately selected according to the size (diameter) of the existing hole to thus cut the hole having a larger diameter than the existing hole with ease, configured to allow the hole enlargement guide and support pieces mounted on the outer peripheral surface of the conical fastener to be simple in structure so that since they can be easily made, conveniently handled because they are lightweight, and have various sizes, they can be freely selected and detachably mounted onto the conical fastener, thereby ensuring wide adaptability.

The present invention may be modified in various ways and may have several exemplary embodiments. It is therefore intended that the scope of the invention be limited not by this detailed description, but rather by the claims appended hereto, and it should be understood that the invention covers all the modifications, equivalents, and replacements within the idea and technical scope of the invention.

What is claimed is:

1. A hole saw with hole enlargement guide and support pieces (50) detachable therefrom, comprising a drive shaft (12) mounted on a chuck of an electric drill (11), a nose bolt (16) and a nose flywheel (18) disposed on the front end periphery of the drive shaft (12), a flywheel nut (19) screw-coupled to the drive shaft (12) under the nose flywheel (18), a plurality of fastening rods (19-1) spaced apart from each other and fitted to the nose flywheel (18) to allow the underside ends thereof to be restrained onto the top surface of the flywheel nut (19), a hole saw body (20) screw-coupled and separated to and from the outer periphery of the nose bolt (16), a coil spring (15) and a dust scattering prevention cap (25) sequentially coupled to the drive shaft (12) formed integrally with the lower end periphery of the nose bolt (16), a conical fastener-fitting rod (30) formed integrally with the center of top end periphery of the nose bolt (16) and having a screw portion (31) formed on the upper end periphery thereof to allow the hole saw body (20) to be detachably mounted thereon, a conical fastener-bouncing coil spring (35) first fitted to the conical fastener-fitting rod (30) from top side of the hole saw body (20), and a conical fastener (40) having the shape of a cone whose top becomes narrow and bottom becomes wide, fixedly coupled to top side of the conical fastener-bouncing coil spring (35), and having an insertion and removal hole (41) formed along the center thereof in up and down directions thereof, wherein the hole enlargement guide and support pieces (50) are spaced apart from each other at given intervals on the outer peripheral surface of the conical fastener (40) and detachably mounted onto the conical fastener (40) through a detachable part, wherein each hole enlargement guide and support piece (50) is inclinedly parallelogram shaped, is the same or similar in length as or to the outer peripheral surface of the conical fastener (40), and has a fastening protrusion (51) protruding from the center of the front end thereof.

2. The hole saw according to claim 1, wherein the hole enlargement guide and support pieces (50) have one of narrow widths (W1), medium widths (W2), and wide widths (W3).

3. The hole saw according to claim 1, wherein the detachable part (60) for fastening the hole enlargement guide and support pieces (50) to the outer peripheral surface of the conical fastener (40) comprises:

a plurality of fastening grooves (62) spaced apart from each other at given intervals along the horizontal center lines of the outer peripheral surface of the conical fastener (40);

coupling grooves (61-1 and 61-2) formed linearly on top and underside of each fastening groove (62);

magnet insertion grooves (63) with screw holes (63-1) formed between the coupling groove (61-1) and the top end of the fastening groove (62) and the coupling groove (61-2) and the underside end of the fastening groove (62); and disc-shaped magnets (64) fastened to the magnet insertion grooves (63) by means of fastening bolts (64-1).

4. The hole saw according to claim 3, wherein the fastening grooves (62) formed on the conical fastener (40) are greater in depth than the coupling grooves (61-1 and 61-2) formed on the conical fastener (40).

5. The hole saw according to claim 1, wherein the hole enlargement guide and support pieces (50) are made of a metal or synthetic resin.

6. The hole saw according to claim 1, wherein the conical fastener (40) comprises an escape prevention washer (65) mounted on top end periphery thereof.

7. The hole saw according to claim 6, wherein the escape prevention washer (65) mounted on top end periphery of the conical fastener (40) and having a through hole formed at the center thereof is fastened, by means of fastening bolts (66), to a washer insertion groove (67) formed on top end periphery of the conical fastener (40) and communicating with a bearing accommodation room (42) formed on top end periphery of the insertion and removal hole (41).

8. The hole saw according to claim 1, wherein the detachable part (60) for fastening the hole enlargement guide and support pieces (50) to the outer peripheral surface of the conical fastener (40) comprises:

a plurality of fastening grooves (62) spaced apart from each other at given intervals along the horizontal center lines of the outer peripheral surface of the conical fastener (40);

coupling grooves (61-1 and 61-2) formed linearly on top and underside of each fastening groove (62);

a fastening ball accommodation room (70) formed on one side surface of each fastening groove (62) in such a manner as to be pierced from the outer peripheral surface of the conical fastener (40) to the fastening groove (62) to allow the outer peripheral surface of the conical fastener (40) and to the fastening groove (62) to communicate with each other and having a screw portion (71) formed on the inner peripheral surface thereof;

a fastening ball (72) and a coil spring (73) inserted sequentially into the fastening ball accommodation room (70); and a tension control bolt (74) coupled to the screw portion (71) of the fastening ball accommodation room (70).

9. The hole saw according to claim 8, wherein the fastening ball accommodation room (70), which is pierced from the outer peripheral surface of the conical fastener (40) to the fastening groove (62) to allow the outer peripheral surface of the conical fastener (40) and the fastening groove (62) to communicates with each other, has a front end periphery (71-1) smaller than a diameter of the fastening ball (72).

10. The hole saw according to claim 1, wherein each hole enlargement guide and support piece (50) has a fastening through hole (52) formed horizontally on the fastening protrusion (51) protruding from the center of the front end thereof.

* * * * *